US010704806B1

(12) United States Patent
Byström (10) Patent No.: US 10,704,806 B1
(45) Date of Patent: Jul. 7, 2020

(54) HOLDER FOR SECURING A FLUID TUBE, A SOLAR COLLECTOR, AND METHOD OF ARRANGING A FLUID TUBE

(71) Applicant: ABSOLICON SOLAR COLLECTOR AB, Härnösand (SE)

(72) Inventor: Joakim Byström, Härnösand (SE)

(73) Assignee: ABSOLICON SOLAR COLLECTOR AB, Härnösand (SE)

( * ) Notice: Subject to any disclaimer, the term of this patent is extended or adjusted under 35 U.S.C. 154(b) by 0 days.

(21) Appl. No.: 16/612,107

(22) PCT Filed: May 15, 2018

(86) PCT No.: PCT/SE2018/050501
§ 371 (c)(1),
(2) Date: Nov. 8, 2019

(87) PCT Pub. No.: WO2018/212705
PCT Pub. Date: Nov. 22, 2018

(30) Foreign Application Priority Data

May 17, 2017 (SE) ...................................... 1750617

(51) Int. Cl.
*F24S 10/70* (2018.01)
*F24S 80/20* (2018.01)
(Continued)

(52) U.S. Cl.
CPC .............. *F24S 10/70* (2018.05); *F24S 80/20* (2018.05); *F24S 2023/87* (2018.05); *F24S 2025/023* (2018.05)

(58) Field of Classification Search
CPC .................................. F24S 70/65; F24S 10/70
(Continued)

(56) References Cited

U.S. PATENT DOCUMENTS

| 3,990,914 A | 11/1976 | Weinstein et al. |
| 5,385,320 A | 1/1995 | Ismert et al. |
(Continued)

FOREIGN PATENT DOCUMENTS

| GB | 2282442 A | 4/1995 |
| JP | S62175555 A | 8/1987 |
(Continued)

OTHER PUBLICATIONS

International Preliminary Report on Patentability dated Apr. 16, 2019 issued in corresponding/related International Application No. PCT/SE2018/050501.
(Continued)

*Primary Examiner* — Vivek K Shirsat
(74) *Attorney, Agent, or Firm* — Patent Portfolio Builders PLLC (57) ABSTRACT

A holder for securing a fluid tube to a trough-formed solar collector. In an operation mode of the solar collector, the holder partly encircles a circumference of a cross-section of the fluid tube and leaves a portion of the circumference un-encircled by the holder. The holder may comprise a base member adapted to abut the fluid tube, the base member comprising at least one securing means adapted to secure the base member to the solar collector. Further, the holder may comprise an immobilizing member adapted to together with the base member immobilize a centre-line of the fluid tube in the solar collector when the fluid tube abuts the holder. The base member is connected with the immobilizing member, such that the base member together with the immobilizing member, in an operation mode of the solar collector, partly encircles the circumference of the cross-section of the fluid tube and forms an opening smaller than a diameter of the cross-section of the fluid tube. The immobilizing member may be pivotably connected to the base member by a
(Continued)

connecting means, such that the immobilizing member can pivot in relation to the base member to, in a service mode of the solar collector, leave an opening larger than the diameter of the cross-section of the fluid tube.

11 Claims, 8 Drawing Sheets

(51) Int. Cl.
*F24S 23/70* (2018.01)
*F24S 25/00* (2018.01)

(58) Field of Classification Search
USPC .............. 126/634, 651, 655, 663, 670, 672, 126/692–695
See application file for complete search history.

(56) References Cited

U.S. PATENT DOCUMENTS

| 5,531,216 | A | * | 7/1996 | Nicklas | .................. | F24S 40/52 |
| | | | | | | 126/599 |
| 2011/0132434 | A1 | | 6/2011 | Correia et al. | | |
| 2013/0022727 | A1 | | 1/2013 | Sherwin | | |

FOREIGN PATENT DOCUMENTS

| JP | 2012241870 A | 12/2012 |
| WO | 2010047656 A1 | 4/2010 |
| WO | 2012025849 A2 | 3/2012 |
| WO | 2015089273 A1 | 6/2015 |

OTHER PUBLICATIONS

International Search Report/Written Opinion dated Jul. 2, 2018 issued in corresponding/related International Application No. PCT/SE2018/050501.
European Patent Office Communication, Rule 71(3) EPC, issued in corresponding European Patent Application 4018728250.4 dated May 7, 2020.

* cited by examiner

Fig. 1 (existing art)

HOLDER FOR SECURING A FLUID TUBE, A SOLAR COLLECTOR, AND METHOD OF ARRANGING A FLUID TUBE

TECHNICAL FIELD

This disclosure relates to energy supply, especially to construction solutions in systems for solar energy production.

BACKGROUND

In modern society energy is consumed by people and industries, e.g. for producing various products, for transport and production of food. Energy could be produced in several forms and from different energy sources. For instance, electricity is often produced from hydroelectric power plants, combustion of coal, oil, or gas. Traditionally, heat has been produced from local combustion or district heating power plants.

With an increasing population and demands for services, energy consumption strongly increases which negatively affects our environment significantly in a negative way. Combustion produces large amount of carbon dioxide and other greenhouse gases. Hydroelectric power plants require large territories to be drowned, etc.

In order to reduce our footprint and negative impression on our environment, demands have been raised for more clean and environmental friendly energy production. Today, renewable energy is produced from wind, sun, ocean waves, etc. The sun provides large amounts of energy to our planet in form of radiated sun beams. Solar radiation can be used by solar cells to generate electricity, e.g. in form of solar cells, or by solar collectors to generate thermal heat.

A concentrating solar collector uses mirrors, lenses, or combinations thereof, to focus the solar radiation in form of a point or a line. In trough-formed concentrating solar collectors a reflector is formed as a curved elongated mirror, which reflects the solar radiation on a receiver arranged along a focusing line of the reflector. The receiver is commonly a black tube filled with a transport fluid, such as water, glycol, or oil. The tube is heated by the concentrated solar radiation and the heat is transferred to the transport fluid that is circulated in a system where the hot transport fluid could be used. The heated transport fluid may be used both as process heat in industrial processes as in district heating, etc.

Figure 1:
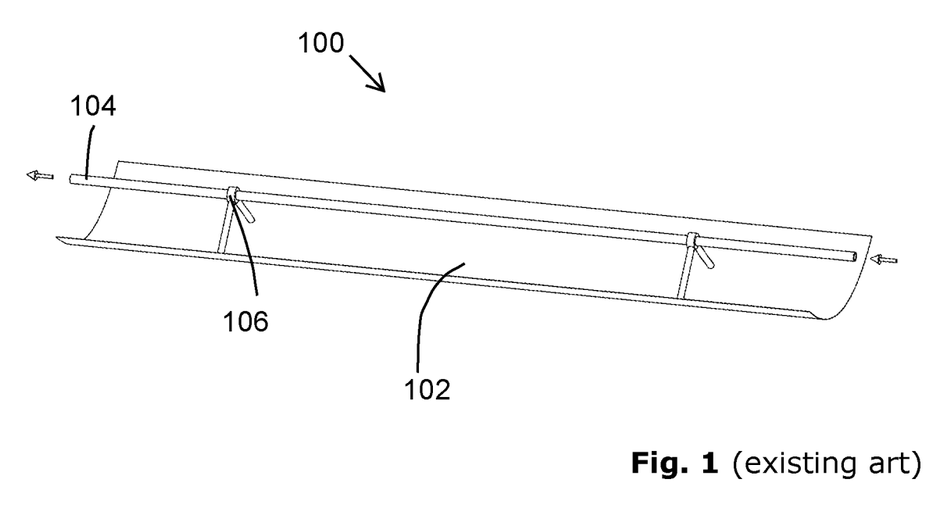
FIG. 1 is a schematic environmental illustration of an arrangement in accordance with existing art.

With reference to FIG. 1, which is a schematic illustration in a perspective view, an example of a concentrating solar collector 100 will now be described.

The concentrating solar collector 100 is a so called PTC (Parabolic Trough Collector, sometimes alternatively referred to as Parabolic Trough solar Collector) and comprises an elongated trough-formed reflector 102 and a fluid tube 104. The fluid tube 104 is arranged at a focus-line of the reflector 102 and the centre-line of the fluid tube 104 is situated such that it substantially coincides with the focus-line of the reflector 102. Through the fluid-tube 104 a transport liquid, e.g. water, flows from one end to the other end (illustrated by the arrows). The transport fluid is then heated by sunbeams reflected by the reflector 102 when hitting the fluid tube 104.

The fluid tube 104 is held by a holder arrangement 106 that situates the fluid tube 104 at the focus-line.

To improve the amount of heat which could be taken care of in PTC arrangements, various construction parameters of reflectors, e.g. material and dimensions have been elaborated.

An example of a PTC solar collector is disclosed in the patent publication WO2010/047656, A1.

It is a challenge to find solutions for improved efficiency in systems for solar energy production.

SUMMARY

It would be desirable to optimize the amount of solar radiation which may be made use of in solar collector arrangements. It is an object of this disclosure to address at least one of the issues outlined above.

Further there is an object to provide a mechanism which limit shadowing of solar collector fluid tubes from receiver holders. These objects may be met by an arrangement according to the attached independent claims.

According to a first aspect, a holder is provided for securing a fluid tube to a trough-formed solar collector. The holder is configured to, in an operation mode of the solar collector, partly encircle a circumference of a cross-section of the fluid tube and leave a portion of the circumference un-encircled by the holder. The holder may be configured to direct the un-encircled portion to face a reflective surface of the solar collector, such that the un-encircled portion is accessible for concentrated solar radiation reflected by the reflective surface.

Furthermore, the holder may comprise a base member adapted to abut the fluid tube, the base member comprising at least one securing means adapted to secure the base member to the solar collector. Further, the holder may also comprise an immobilising member adapted to together with the base member immobilise a centre-line of the fluid tube in the solar collector when the fluid tube abuts the holder. The base member is connected with the immobilising member, such that the base member together with the immobilising member can partly encircle the circumference of the cross-section of the fluid tube and, in the operation mode of the solar collector, form an opening smaller than a diameter of the cross-section of the fluid tube. The immobilising member may be pivotably connected to the base member by a connecting means, such that the immobilising member can pivot in relation to the base member to and, in a service mode of the solar collector, leave an opening larger than the diameter of the cross-section of the fluid tube.

Moreover, the holder may comprise one or more contact means arranged to abuts the fluid tube, e.g. slidably or rollably.

According to a second aspect, a solar collector is provided that comprises a trough-formed reflector, at least one holder according to the first aspect, and a fluid tube for receiving reflected solar radiation from the reflector. The fluid tube is connected to the solar collector by the at least one holder.

According to a third aspect, a method is provided of arranging a fluid tube in a trough-formed solar collector. The method comprises arranging a holder for the fluid tube in the solar collector, and arranging the fluid tube in the holder such that the fluid tube abuts the holder, and, when the solar collector is in an operation mode, the holder partly encircles the fluid tube and leaves a portion of the circumference un-encircled by the holder. Arranging the fluid tube may comprise directing the un-encircled portion to face a reflective surface of the solar collector, such that the un-encircled portion is accessible for concentrated solar radiation reflected by the reflective surface. By connecting a fluid tube to a trough-formed solar collector with a holder according to some of the above described aspects, the fluid tube may be reliably positioned in the solar collector and simultaneously limit shadowing of the fluid tube, which may give rise to an increased amount of solar radiation which may be made use of. In addition, the un-encircled portion of the fluid tube may be exposed for reflected radiation from the reflector, which advantageously may improve the solar collector's efficiency further.

BRIEF DESCRIPTION OF DRAWINGS

The solution will now be described in more detail by means of exemplifying embodiments and with reference to the accompanying drawings, in which.

DETAILED DESCRIPTION

A receiver holder for a trough-formed solar collector, i.e. a PTC, will now be disclosed in accordance with some exemplifying embodiments.

With reference to the FIGS. 2a and 2b, which are schematic illustrations, a trough-formed solar collector 400 will now be described in accordance with one exemplifying embodiment. In order to facilitate the understanding the same reference numbers will be applied in the figures when appropriate.

Figure 2A:
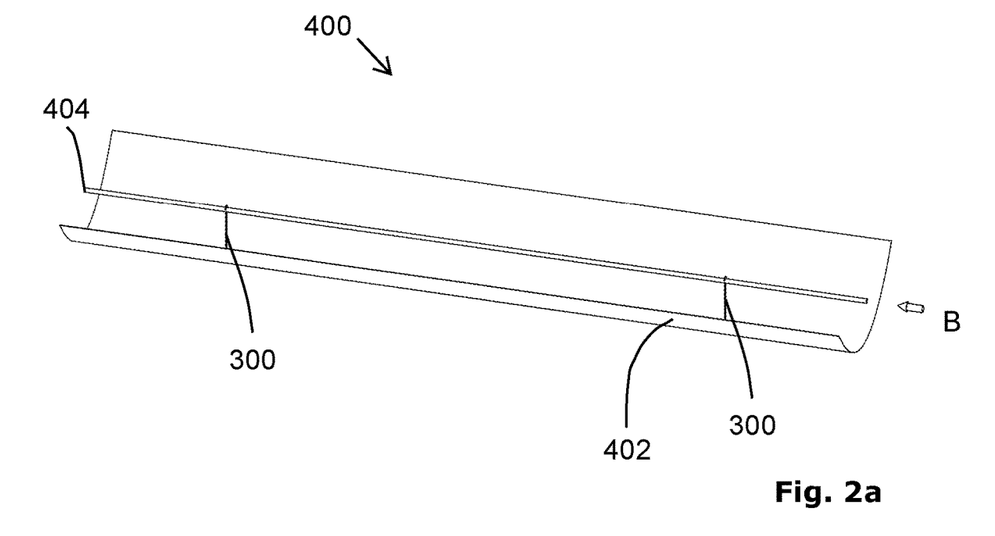
FIG. 2a-b are schematic illustrations of arrangements, according to possible embodiments.

FIG. 2a is a schematic perspective view of the solar collector 400 according to an exemplifying embodiment. The solar collector 400 comprises an elongated reflector 402 and a fluid tube 404. The fluid tube 404 is arranged along a focus-line of the reflector 402 and held at the focus-line by two holders 300. The holders 300 will be further disclosed below in some exemplifying embodiments.

Figure 2B:
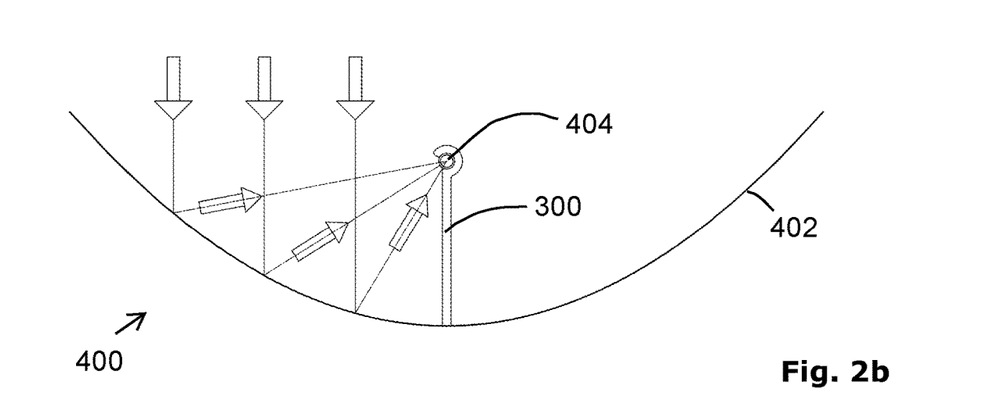

FIG. 2b is a schematic cross-sectional view of the solar collector 400 seen from the right side, i.e. along the arrow B in FIG. 2a. The solar collector 400 pivots about the centre-line of the fluid tube 404 to adjust to the sun height during the day. Thereby, the opening of the trough-formed reflector 402 faces the sun, and direct sunbeams are reflected by the reflector 402 onto the fluid tube 404 and heats the transport fluid in the fluid tube 404. In general, PTCs pivot about a horizontal axis to face the sun optimally. In one type of PTCs, the fluid tubes are fixed and the PTCs pivots about the fluid tubes' respective centre-lines, and in other types of PTCs the fluid tube pivots with their reflectors about a horizontal axis which is distanced from the centre-lines. In both types, the holders 300 prevent some reflected radiation from accessing the fluid tubes.

Conventional trough-formed solar collectors have their fluid tubes exposed for reflected sunbeams except at the tube holders, which encircle the circumference of the fluid tube to hold the fluid tube and fixate its centre-line near the reflector's focus-line. I.e. conventional tube holders block the reflected solar radiation near the tube, where it is as most concentrated.

The holder 300 of this embodiment holds the fluid tube 404 but encircles only partly the fluid tube's circumference, i.e. a portion of the circumference is still accessible when the fluid tube is arranged in the holder 300. Thereby, the accessible area of the fluid tube 404 increases and reflected concentrated solar radiation which otherwise would have been blocked by the holder 300, i.e. would have been prevented from reaching the fluid tube 404 will reach the fluid tube 404, which advantageously results in improved heat exchange.

By minimising the blocking parts of the holders 300, e.g. by reducing the physical dimensions of the holders 300, less radiation will be blocked, which improves the amount of the concentrated solar radiation that could be made use of for heat exchange. However, there is a limit how much the physical dimensions of the holders 300 could be reduced and still reliably holding the fluid tube 404. The fluid tube 404 is hot and the holder 300 must be able to properly pivot about the fluid tube 404.

In this embodiment, the part of the holder 300 which will hold the fluid tube 404 is instead designed with an opening leaving a part of the fluid tube's 404 circumference accessible for reflected sunbeams. Thereby, the holder 300 will give rise to improved heat exchange. Because the physical dimensions of the holder 300 do not will be reduced, the holder 300 will both properly hold the fluid tube 404 and enable the holder 300 to pivot in relation to the fluid tube 404.

Typically, in mornings and evenings when the angle α is substantial, it would be desirable to implement the disclosed solution.

With reference to the FIGS. 3a-3d, which are schematic illustrations, some exemplifying embodiments of holders 300 for fluid tubes will now be described. Regarding the FIGS. 3a-3d but also 4a-4f, the same reference numbers have been applied throughout the description when appropriate, in order to facilitate the understanding.

Figure 3A:
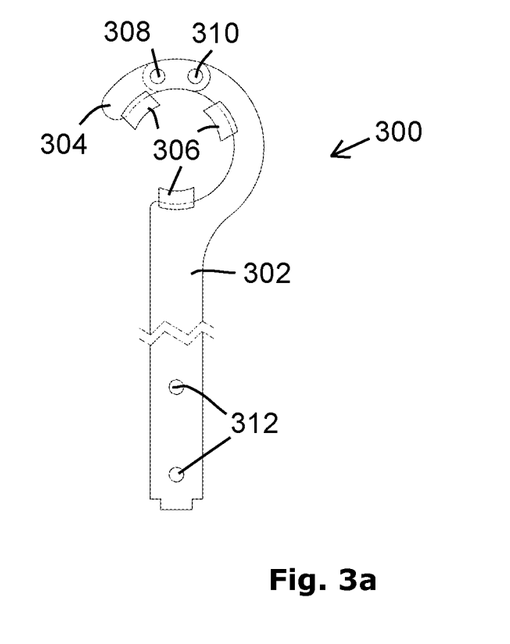
FIGS. 3a-d are schematic illustrations of arrangements, according to possible embodiments.

FIG. 3a illustrates an exemplifying embodiment of a holder 300. The holder 300 comprises a base member 302 and an immobilising member 304. In FIG. 3a the base member 302 is illustrated as cut. The base member 302 and the immobilising member 304 are connected to each other by a connecting means 310. In this embodiment, the connecting means 310 is designed as respective holes in the base member 302 and the immobilising member 304, and a screw (not shown) to be inserted through the holes. Thereby, the immobilising member 304 is enabled to pivot about the screw to swing up into a service mode where an opening that is larger than a diameter of the fluid tube's cross-section is described. The fluid tube may then be inserted, before the immobilising member 304 is pivoted or swung back to a position where the opening is smaller than the diameter of the fluid tube's cross-section, i.e. an operation mode. Thereby, in the operation mode, the holder 300 reliably positions the fluid tube in the solar collector and leaves a portion of the fluid tube un-encircled. The un-encircled portion decreases the area of the fluid tube 404 which normally should have been shadowed by traditional holders. This gives rise to that the amount of radiation which hits the fluid tube increases. Thus, the present holder 300 will reliably position the fluid tube in the solar collector and decrease shadowing of the fluid tube, which improves operation characteristics of the solar collector.

Furthermore, as illustrated in FIG. 3a, the holder 300 may optionally by equipped with specific contact means 306 by which the holder 300 abuts the fluid tube.

In an alternative exemplifying embodiment, which is based on some other embodiments of this disclosure, contact means 306 are arranged at both the base member 302 and the immobilising member 304. A heat resistant material which also has durable characteristics, e.g. slide or wear characteristics, will be selected for manufacturing the contact means 306. For instance, a plastic material such as PEEK (Polyetheretherketone) may be selected as material for manufacturing the contact means 306. Moreover, the contact means 306 may in addition also comprise other materials, e.g. PTFE (Polytetrafluoroethylene) and/or carbon additives may be applied as a coating, an infuse, or a mix, in order to further improve slide characteristics. Because the material of the contact means 306 facilitates the surface of the fluid tube to slide in the holder 300, the holder 300 may in addition also enable longitudinal sliding of tube, e.g. due to length variations caused by temperature, i.e. thermal expansion. In an alternative embodiment, which is based on some above described embodiments, a locking means 308 is arranged. Correspondingly, as the above described connecting means 310, the locking means 308 is implemented as a screw and respective through holes of the base member 302 and immobilising member 304. By arranging such a locking means 308, the holder 300 may reliably be kept in the operation mode where the centre-line of the fluid tube is positioned to operate properly. Typically, in operation mode, the fluid tube will be held such that its centre-line will be positioned close to a focus-line of the solar collector's reflector. I.e. the centre-line of the fluid tube will be secured to the PTC, but the PTC will be allowed to pivot about the fluid tube, e.g. by sliding or rolling. In addition, the fluid tube will be allowed to expand longitudinally when secured, which enables reliable securing of the centre-line even when the fluid tube's temperature variates. Furthermore, in FIG. 3a, a pair of optional through holes 312 is illustrated by which the base member 302 may be secured to the solar collector.

In addition, the base member 302 may be implemented as having a reflective surface in order to further increase the amount of solar radiation that can be taken advantage of, i.e. that reaches the fluid tube's surface.

Figure 3B:
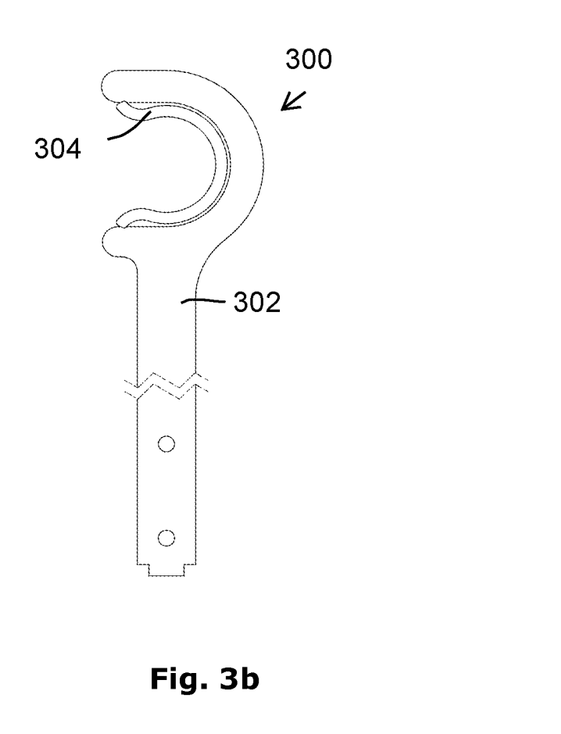

FIG. 3b illustrates another exemplifying embodiment of a holder 300 for a fluid tube of a solar collector.

The holder 300 illustrated in FIG. 3b comprises a base member 302 and an immobilising member 304, however, compared with FIG. 3a, the immobilising member 304 is alternatively implemented. In this embodiment, the immobilising member 304 is a resilient element, and the fluid tube will be pressed into a gap of the immobilising member 304. At insertion, the immobilising member 304 is deformed such that the gap increases, but returns to its original form after insertion to hold the fluid tube in an operation position. Furthermore, as seen in FIG. 3b, the base member 302 of this embodiment is provided by means for securing the immobilising member 304 to the base member 302, e.g. recesses adapted to receive corresponding protrusions of the immobilising member 304. In comparison with the holder 300 illustrated in FIG. 3a, because the immobilising member 304 of this embodiment is resilient and attached to the base member 302, the holder 300 does not need to have any specific pivotable connection means or locking means arranged as in the embodiment described in conjunction with FIG. 3a. Thereby, efficiency when arranging the fluid tube in the holder 300 may be further improved.

Figure 3C:
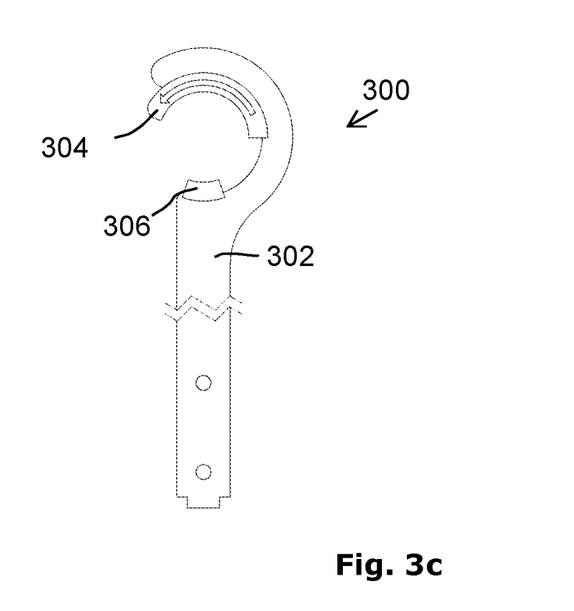

FIG. 3c illustrates another exemplifying embodiment of a holder 300 for a fluid tube of a solar collector.

The holder 300 illustrated in FIG. 3c comprises a base member 302 and an immobilising member 304, however, compared with FIG. 3b, the immobilising member 304 is alternatively implemented. In this embodiment, the immobilising member 304 is a slidable element which is adapted to slide along the base member 302 between a position of a service mode where a gap which is larger than a diameter of the fluid tube's cross-section is described, and a position of an operation mode where the gap is smaller than the diameter is described. The slide characteristics between the immobilising member 304 and the fluid tube is more smooth than the slide characteristics between the base member 302 and the immobilising member 304. Thereby, when the immobilising member 304 is in operation mode, the immobilising member 304 and a contact means 306 are enabled to slide about the fluid tube. I.e. the different slide characteristics prevents the immobilising member 304 from changing modes when the holder 300 rotates about the fluid tube.

Figure 3D:
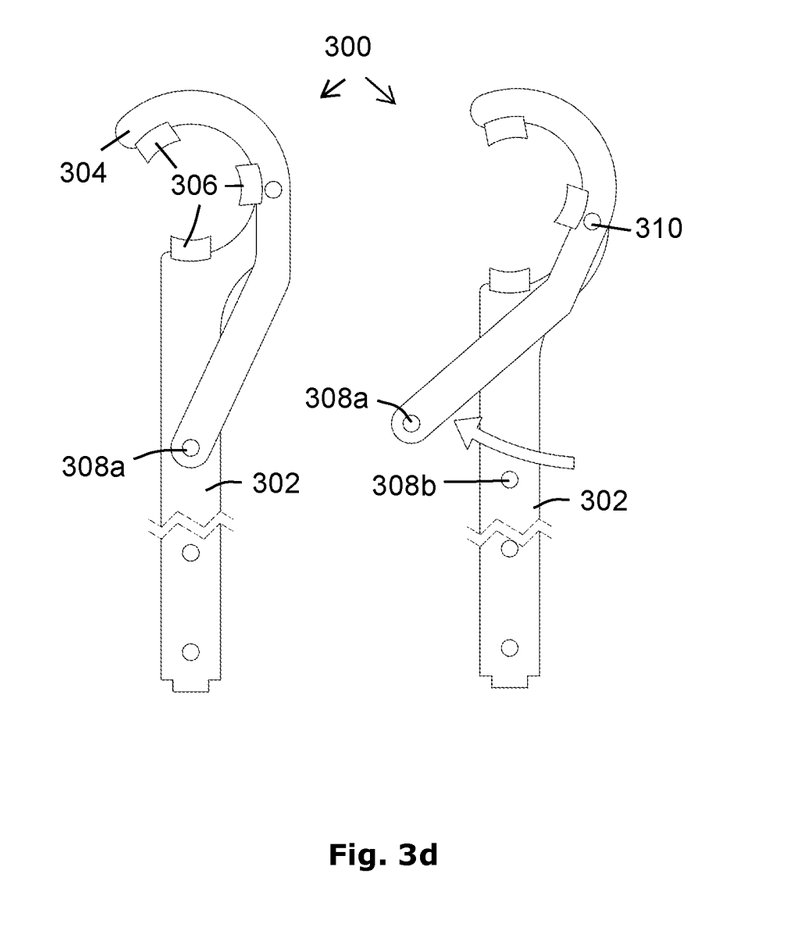

FIG. 3d illustrates another exemplifying embodiment of a holder for a fluid tube of a solar collector.

The holder 300 illustrated in FIG. 3d is similar with the holder 300 described in conjunction with FIG. 3a. The holder 300 of this embodiment differs in that the immobilising member 304 is provided with a portion located opposite the connecting means 310. Furthermore, the locking means 308a/308b of this embodiment is provided as a first part 308a of the immobilising member 304 and a second part of the base member 308b. The locking means 308a/308b may be implemented as through-holes and a screw, rivet or pin, without being limited thereto. Furthermore, other alternative implementations will also be covered by the disclosed concept, e.g. the first part 308a may be an extension adapted to fit into a corresponding recess, i.e. the second part 308b, of the base member 302. Both the first and second parts 308a, 308b may be recesses and one of them may comprise a spring-loaded ball adapted to fit into the other recess, etc. By providing the immobilising member with this opposite located portion, the process of arranging the fluid tube in the holder 300 may be facilitated and more effective.

With reference to the FIGS. 4a-4f, which are schematic illustrations, some further exemplifying embodiments of holders 300 for fluid tubes will now be described.

Figure 4A:
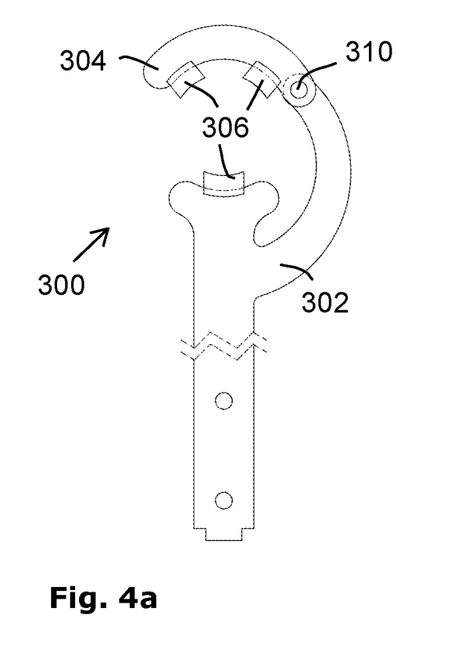
FIGS. 4a-f are schematic illustrations of arrangements, according to possible embodiments.

FIG. 4a illustrates another exemplifying embodiment of a holder 300 for a fluid tube of a solar collector.

The holder 300 illustrated in FIG. 4a is similar with the holder 300 described in conjunction with FIG. 3a. The holder 300 of this embodiment differs in that, instead of one, two un-encircled portions are present when the holder 300 is in operation mode. By modifying the base member 302 such that the portion of the base member 302 that connects to the immobilising member 304 is distanced from the focus-line of the solar collector, the holder 300 is enabled to reliably position the fluid tube in the solar collector with multiple portions of the fluid tube's circumference accessible for reflected radiation. In addition, distancing this portion of the base member 302 implies that it will be located at a position where the solar concentration is lower than near the fluid tube, which may further improve the amount of solar radiation which may be made use of.

Figure 4B:
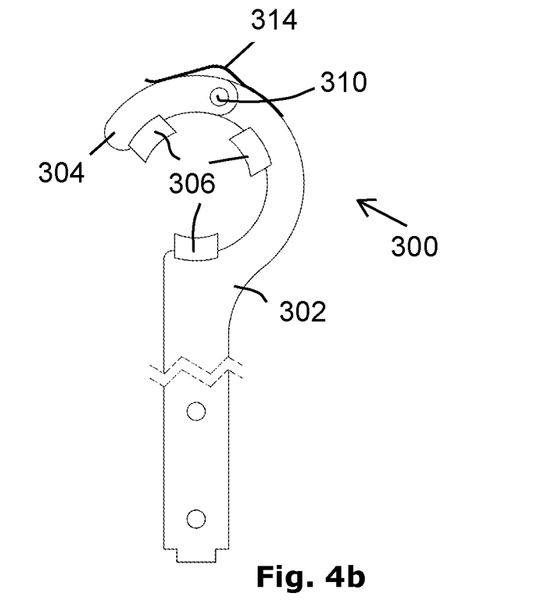

FIG. 4b illustrates another exemplifying embodiment of a holder 300 for a fluid tube of a solar collector.

The holder 300 illustrated in FIG. 4b is similar with the holder 300 described in conjunction with FIG. 3a. The holder 300 of this embodiment differs in that instead of a locking means 308, a resilient member 314 is arranged. The resilient member 314 will regulate a pressure at the fluid tube from the immobilising member 304. The resilient member 314 may be arranged as an alternative to the locking means 308, and control the pressure on the fluid tube. For instance, the resilient member 314 may compensate for variating radial dimensions of the fluid caused by temperatures variations.

Figure 4C:
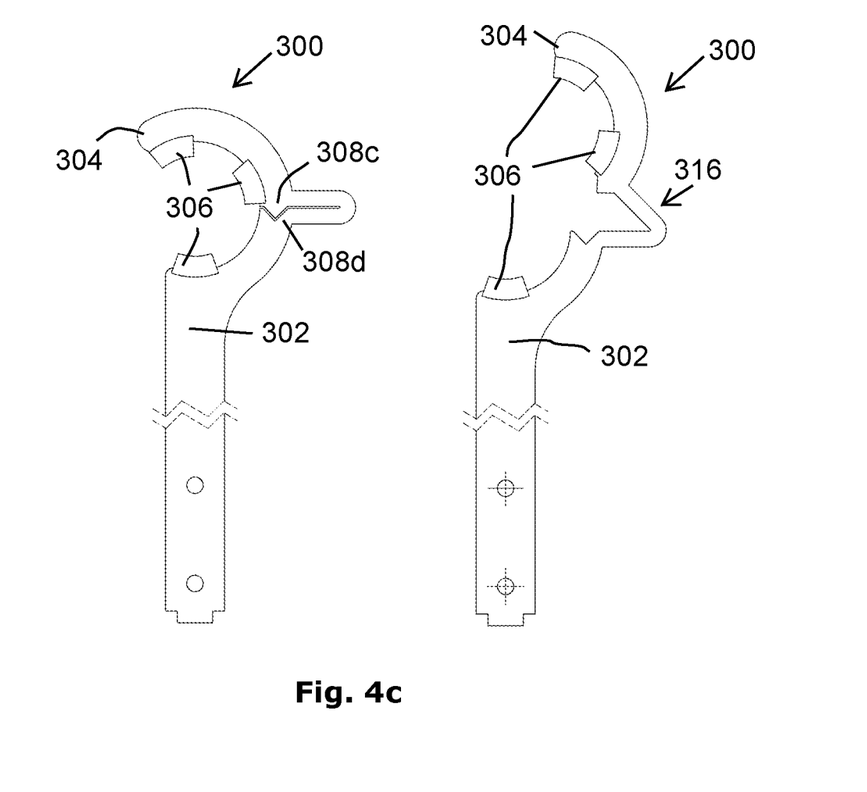

FIG. 4c illustrates another exemplifying embodiment of a holder 300 for a fluid tube of a solar collector.

The holder 300 illustrated in FIG. 4c is similar with the holder 300 described in conjunction with FIG. 3a. The FIG. 4c comprises two views of which the left view illustrates the holder 300 in operation mode, and the right view illustrates the holder 300 in service mode, i.e. before the fluid tube (not shown) is arranged.

The holder 300 of this embodiment differs in that the base member 302 and the immobilising member 304 are integrated and manufactured in one piece. The base member 302 is connected to the immobilising member via a hinge 316. When the fluid tube has been arranged, the hinge 316 is closed, i.e. the immobilising member 304 may be pressed towards the base member 302 to achieve a gap which is smaller than the diameter of the fluid tube's cross-section. In order to achieve correct positioning of the immobilising member 304, both the base member 302 and the immobilising member 304 may be equipped with respective locking means 308c, 308d. As seen in FIG. 4c, the locking means may be designed as a combination of an extension 308c and a recess 308d, which may facilitate an appropriate positioning of the integrated base member 302 and immobilising member 304 with respect to each other when pressed together.

By providing the holder 300 in one peace, manufacturing of the holder 300 may be more efficient. Further may the arrangement of the fluid tube be simplified and more efficient, both giving rise decreased costs for end-users of solar collectors.

In the above described embodiments, the connecting means 310 is designed as combinations of through holes and screws, without being limited thereto. As will be disclosed below in other exemplifying embodiments, other alternative connecting means may be arranged instead when appropriate without deviating from the inventive concept, e.g. pins, rivets, hinges, etc. Correspondingly, the locking means 308 may be alternatively implemented within the disclosed concept.

Regarding the contact means 306 of the above described embodiments, the inventive concept is not limited to slidable contact means, instead one or more of the contact means 306 may be arranged as being in rollable contact with the fluid tube when abutting the fluid tube. For instance, the contact means may be designed as rollers or balls arranged at the base member 302 and/or the immobilising member 304, when appropriate.

Figure 4D:
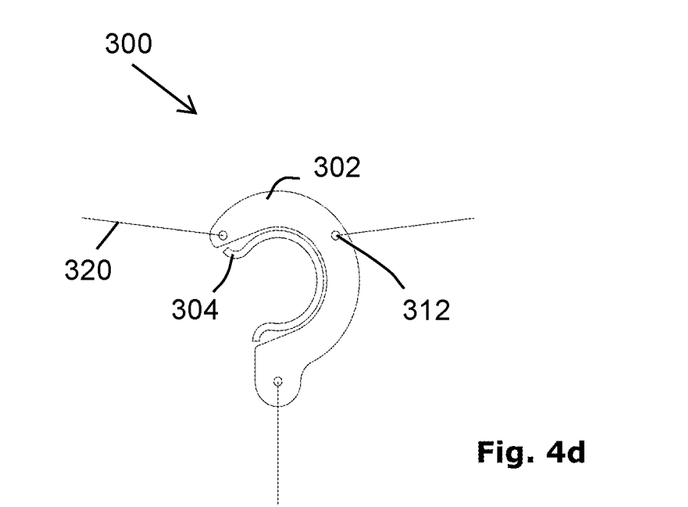
Figure 4E:
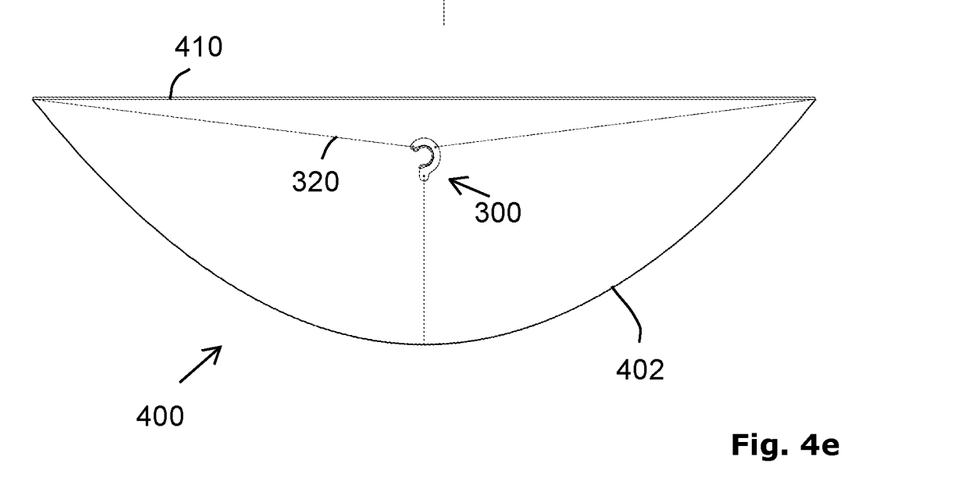
Figure 4F:
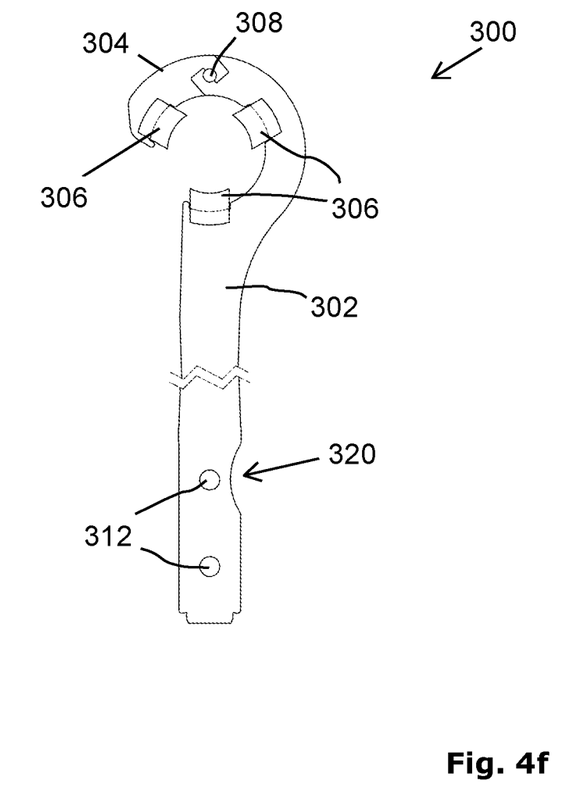

FIGS. 4d and 4f illustrate a holder 300 for a fluid tube of a solar collector 400 in accordance with one exemplifying embodiment.

The holder 300 comprises a base member 302 and an immobilising member 304 similar to the holder 300 described in conjunction with FIG. 3b. The holder 300 comprises a plurality of wires 320 adapted to secure the holder 300 to the solar collector 400. The wires 320 are attached to the holder by holes 312 performed in the base member 302. The holes 312 is a non-limiting example of securing means. Alternatively, the wires comprise respective washers with holes by which the wires will may be secured by screws and nots, rivets, pins, etc.

In FIG. 4e the solar collector 400 is illustrated from a side view with the holder 300 arranged. In FIG. 4e, the reflector 402 is covered with a glass 410, to protect the reflector 402 surface and the fluid tube (not shown) from being negatively affected by environmental effects, e.g. caused by humidity or dust.

With reference to FIG. 4f, a holder 300 will be described according to one exemplifying embodiment. The holder 300 is related to some above described embodiments and the same reference numbers will be applied when appropriate. The holder 300 comprises a base member 302 and an immobilising member 304 as earlier described.

However, in this embodiment the immobilising member 304 is alternatively designed to facilitate and enable a less complex locking of the immobilising member 304 to the base member 302. When the immobilising member 304 is appropriately positioned at the base member 302, a locking means 308 appears. The locking means 308 describes a hole through which a screw, bolt, rivet, etc. may be introduced to lock the position of the immobilising member 304 with respect to the base member 302.

Furthermore, contact means 306 may be arranged at the base member 302 and the immobilising member 304, respectively, as described above. In addition, securing means 312, e.g. a pair of holes adapted to receive screws, rivets or pins may be arranged to secure the holder 300 to the solar collector, correspondingly to as described in conjunction with an embodiment with reference to FIG. 3a. The holder 300 of this embodiment, but also of the above described embodiments, may further comprise a guiding means 320 designed as a recess to facilitate mounting of the holder 300 to the PTC.

The characterising features of the above described embodiments are not limited to the specific embodiments in which they are described. When designing a holder 300 for a fluid tube, features of one or more of the described embodiments may be combined, without deviating from the inventive concept. For instance, a suitable locking means may be selected and may be used of together with a suitable arrangement of contact means, when appropriate. Moreover, the base members 302 may be alternatively implemented. For instance, a base member may be implemented as any suitable component that secures the fluid tube in the solar collector. For instance, such base members may be secured to e.g.: a support member of the solar collector, to the reflector, to the covering glass, etc. The base member may further be secured by screws, wires, glue, magnets, etc. when appropriate.

A solar collector 400 will now be described in accordance with one exemplifying embodiment and by returning to the above described FIGS. 2a-2b.

The solar collector 400 comprises a trough-formed reflector 402, and at least one holder 300 of any of the types described above in conjunction with the FIGS. 3a-3d, and 4a-e. In FIG. 2a-2b the holders 300 are schematically illustrated. In addition, the solar collector 400 comprises a fluid tube 404 connected to the solar collector 400 by the holders 300.

Figure 5:
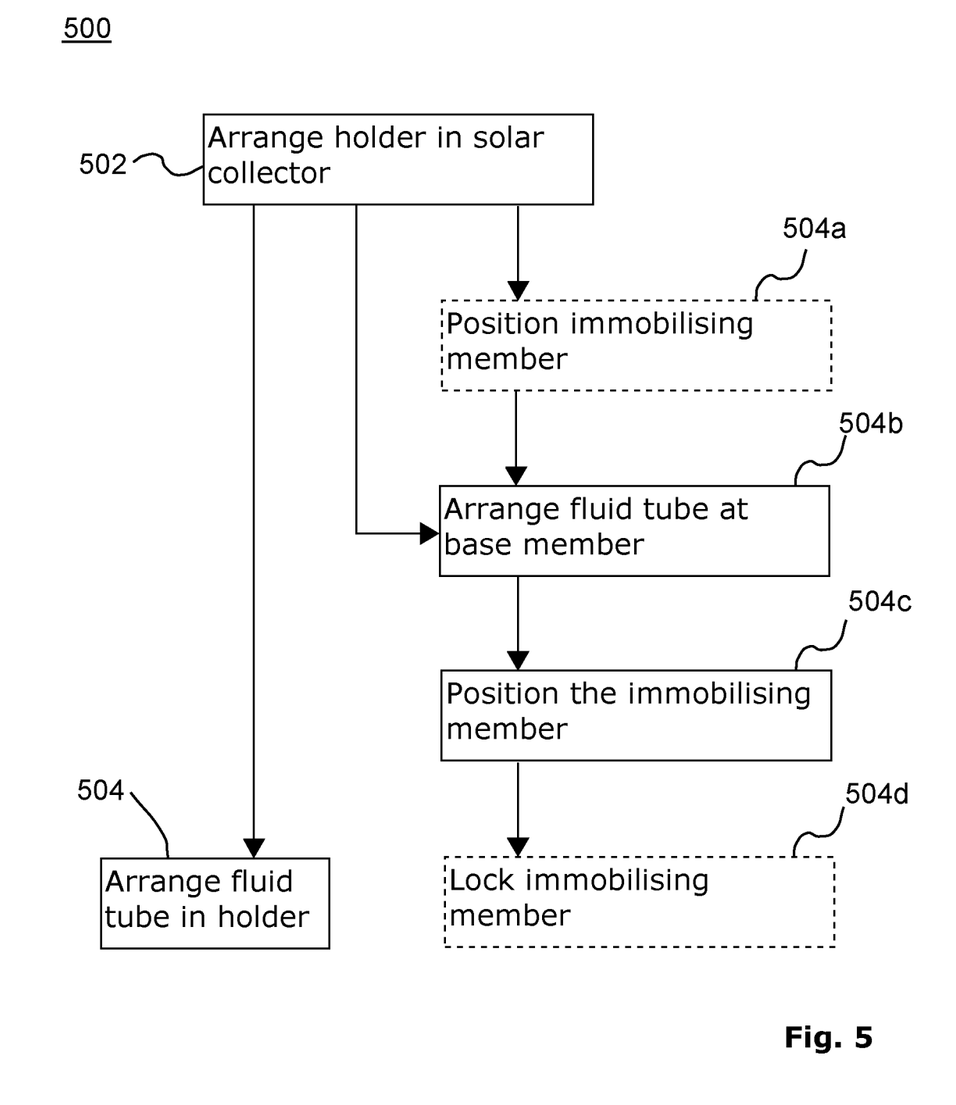
FIG. 5 is a schematic flowchart of a method, according to possible embodiments.

With reference to FIG. 5, which is a schematic flow chart, a method 500 of arranging a fluid tube in a holder will now be described in accordance with one exemplifying embodiment.

In a first action 502, one or more holders for a fluid tube is arranged in a solar collector. The holders may be arranged by securing respective base members of the holders to a support member of the solar collector, e.g. a support member located behind a reflector, or by securing wires of the holders to the solar collector. I.e. typically, the base member of each holder is secured to a corresponding support member of the solar collector.

In a following action 504, the fluid tube is arranged in the holders such that the fluid tube abuts the holder, and when the solar collector is in an operation mode partly encircles a circumference of a cross-section of the fluid tube and at least a portion of the circumference is un-encircled by the holder. As described above in conjunction with another exemplifying embodiment, because the holder leaves one or more gaps that are smaller than a diameter of the fluid tube's diameter, the fluid tube will be reliably positioned in the holder.

The action 504 of arranging the fluid tube in the holder may comprise further sub-actions, which will now be described in accordance with an exemplifying embodiment that is related to the above described embodiment.

Also this embodiment starts with the above described action 502 of arranging the holder in the solar collector.

In a following action 504b, the fluid tube is arranged at a base member of the holder.

In a subsequent action 504c, a position of an immobilising member of the holder is adjusted such that the base member together with the immobilising member partly encircles the circumference of the cross section of the fluid tube, and forms an opening that is smaller than the diameter of the cross-section of the fluid tube.

The action 504b may be preceded by an optional action 504a, where it is ensured that the immobilising member of the arranged holder is positioned in a service mode, i.e. the base member together with the immobilising member will leave a gap that is larger than the fluid tube's diameter.

Furthermore, the method may comprise a final action 504d, in which the immobilising member is locked in an operation mode, i.e. the immobilising member is locked to the base member and leaves a gap which is smaller than the fluid tube's diameter.

Reference throughout the specification to "one embodiment" or "an embodiment" is used to mean that a particular feature, structure or characteristic described in connection with an embodiment is included in at least one embodiment.

Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps.

Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A holder for securing a fluid tube to a trough-formed solar collector, wherein the holder is configured to, in an operation mode of the solar collector, partly encircle a circumference of a cross-section of the fluid tube and leave a portion of the circumference un-encircled by the holder, and direct the un-encircled portion to face a reflective surface of the solar collector, such that the un-encircled portion is accessible for concentrated solar radiation reflected by the reflective surface, the holder comprising:

a base member adapted to abut the fluid tube, the base member comprising at least one securing means adapted to secure the base member to the solar collector, and an immobilizing member adapted to together with the base member immobilize a centre-line of the fluid tube in the solar collector when the fluid tube abuts the holder, the base member being connected with the immobilizing member, such that the base member together with the immobilizing member can partly encircle the circumference of the cross-section of the fluid tube and, in the operation mode of the solar collector, form an opening smaller than a diameter of the cross-section of the fluid tube, wherein the opening is located asymmetrically in relation to the solar collector's optical plane of symmetry;

wherein at least one of the base member and the immobilizing member comprises one or more contact means arranged to abut the fluid tube;

wherein the contact means are adapted to slidably or rollably abut the fluid tube.

2. The holder according to claim 1, wherein the immobilizing member is pivotably connected with the base member by a contact means, such that the immobilizing member can pivot in relation to the base member and, in a service mode of the solar collector, leave an opening larger than the diameter of the cross-section of the fluid tube.

3. The holder according to claim 1, wherein the contact means comprises at least one material of: Polyetheretherketone, PEEK, Polytetrafluoroethylene, PTFE, and carbon to slidably abut the fluid tube, or wherein the contact means are designed as rollers or balls to rollably abut the fluid tube.

4. The holder according to claim 1 further comprising a resilient member adapted to regulate a pressure from the holder on the fluid tube.

5. The holder according to claim 1, wherein the base part has a reflective surface.

6. A solar collector comprising:
a trough-formed reflector,
at least one holder according to claim 1, and
a fluid tube for receiving reflected solar radiation from the reflector, the fluid tube being connected to the solar collector by the at least one holder.

7. A method of arranging a fluid tube in a trough-formed solar collector, comprising:

arranging a holder for the fluid tube in the solar collector, the holder comprising a base member and an immobilizing member connected to each other, and arranging the fluid tube in the holder such that the fluid tube abuts the holder, and, when the solar collector is in an operation mode, the holder partly encircles a circumference of a cross-section of the fluid tube and leaves a portion of the circumference un-encircled by the holder, wherein arranging the fluid tube comprises directing the un-encircled portion to face a reflective surface of the solar collector, such that the un-encircled portion is accessible for concentrated solar radiation reflected by the reflective surface, by:

arranging the fluid tube at the base part, and adjusting the position of the immobilizing means to immobilize a centre-line of the fluid tube in the solar collector, such that the base member together with the immobilizing member partly encircles the circumference of the cross-section of the fluid tube, and forms an opening smaller than a diameter of the cross-section of the fluid tube, wherein the opening is located asymmetrically in relation to the solar collector's optical plane of symmetry.

8. The method of arranging the holder according to claim 7, wherein arranging the fluid tube in the holder comprises, by a locking arrangement, locking the immobilizing member, the locking arrangement being arranged at any of the base member and the immobilizing member.

9. The method of arranging the fluid tube according to claim 7, further comprising, by a locking arrangement, locking the immobilizing member, the locking arrangement being arranged at any of the base member and the immobilizing member.

10. A holder for securing a fluid tube to a trough-formed solar collector, wherein the holder is configured to, in an operation mode of the solar collector, partly encircle a circumference of a cross-section of the fluid tube and leave a portion of the circumference un-encircled by the holder, and direct the un-encircled portion to face a reflective surface of the solar collector, such that the un-encircled portion is accessible for concentrated solar radiation reflected by the reflective surface, the holder comprising:

a base member adapted to abut the fluid tube, the base member comprising at least one securing means adapted to secure the base member to the solar collector, and an immobilizing member adapted to together with the base member immobilize a centre-line of the fluid tube in the solar collector when the fluid tube abuts the holder, the base member being connected with the immobilizing member, such that the base member together with the immobilizing member can partly encircle the circumference of the cross-section of the fluid tube and, in the operation mode of the solar collector, form an opening smaller than a diameter of the cross-section of the fluid tube, wherein the opening is located asymmetrically in relation to the solar collector's optical plane of symmetry; and a locking arrangement adapted to lock the immobilizing member in relation to the base member, the locking arrangement being arranged at any of the base member and the immobilizing member, or on both of the base member and the immobilizing member.

11. A solar collector comprising:

a trough-formed reflector, at least one holder according to claim 10, and a fluid tube for receiving reflected solar radiation from the reflector, the fluid tube being connected to the solar collector by the at least one holder.

* * * * *